United States Patent [19]

Ikefuji

[11] Patent Number: 5,260,995
[45] Date of Patent: Nov. 9, 1993

[54] ELECTRIC POWER CIRCUIT FOR TELEPHONE SET USE

[75] Inventor: Yoshihiro Ikefuji, Kyoto, Japan

[73] Assignee: Rohm Co., Ltd., Kyoto, Japan

[21] Appl. No.: 546,853

[22] Filed: Jul. 2, 1990

[30] Foreign Application Priority Data

Jul. 3, 1989 [JP] Japan .................................. 1-171380

[51] Int. Cl.⁵ ............................................. H04M 1/00
[52] U.S. Cl. .................................. 379/413; 379/402; 379/345; 379/405
[58] Field of Search ................ 379/398, 399, 402, 405, 379/413, 345

[56] References Cited

U.S. PATENT DOCUMENTS

| 4,275,277 | 6/1981 | Ferrieu .................................. 379/413 |
| 4,278,847 | 7/1981 | Wortman ............................... 379/405 |
| 4,727,574 | 2/1988 | Takato ................................... 379/413 |
| 4,731,830 | 3/1988 | Thomson . | |
| 4,827,505 | 5/1989 | Takato et al. ........................ 379/413 |
| 4,935,960 | 6/1990 | Takato et al. ........................ 379/399 |

FOREIGN PATENT DOCUMENTS

2500691 8/1982 France .
2102248 1/1983 United Kingdom .

Primary Examiner—James L. Dwyer
Assistant Examiner—Jhancy Augustus
Attorney, Agent, or Firm—Fish & Richardson

[57] ABSTRACT

An electric power circuit for telephone set use utilizing a power source drawn from a telephone circuit line. Alternating current components superimposed on a supply voltage, which is taken out by means of a by-pass capacitor, are delivered to a downstream-side of the common-base of an input-side transistor comprised in a current mirror circuit. A constant value of direct-current, which is the same magnitude as a potential difference between the supply voltage and a potential of the common-base of the current mirror circuit, is obtained at the input side transistor by varying the potential of the common base in accordance with fluctuations due to a.c. components superimposed on the supply voltage. An amplified direct-current is output from the output-side transistor capable of producing a magnitude of current in proportion to that of the input-side current. To secure the stable magnitude of the amplified currents, a transistor is disposed at the downstream of the output-side transistor because it is necessary to vary a potential at the output terminal of the output-side transistor in accordance with fluctuations due to a.c. components on the supply voltage in the same manner as to vary the base potential of the input-side transistor, thereby ensuring potential differences between the downstream of the output-side transistor and the emitter thereof at a predetermined value or more. Concurrently, presence of high impedance to voice signals superimposed on the supply voltage is secured by a pair of voltage dividing resistors disposed at the downstream of the input-side transistor.

7 Claims, 6 Drawing Sheets

ELECTRIC POWER CIRCUIT FOR TELEPHONE SET USE

BACKGROUND OF THE INVENTION

1. Field of the Invention

This invention relates to an electric power circuit for telephone set use which utilizes a power drawn from a telephone circuit line, and more particularly to an electric power circuit capable of providing high voltage and large magnitudes of current.

2. Description of the Related Art

In accordance with the dramatic development of the semiconductor techniques in recent years there has been widely adopted a telephone set having a function such as a re dialing function that repeats a dialing of the telephone number once dialed or a dialing function by using an abbreviated telephone number which dials telephone numbers preliminary stored by entering corresponding abbreviated numbers, and the like. In such a telephone, a dialer IC is incorporated in order to perform a dialing; that is, the dialer IC offers the dialing function.

A general structure of a conventional telephone set will be explained with reference to FIG. 7 of the accompanying drawings.

Figure 7:
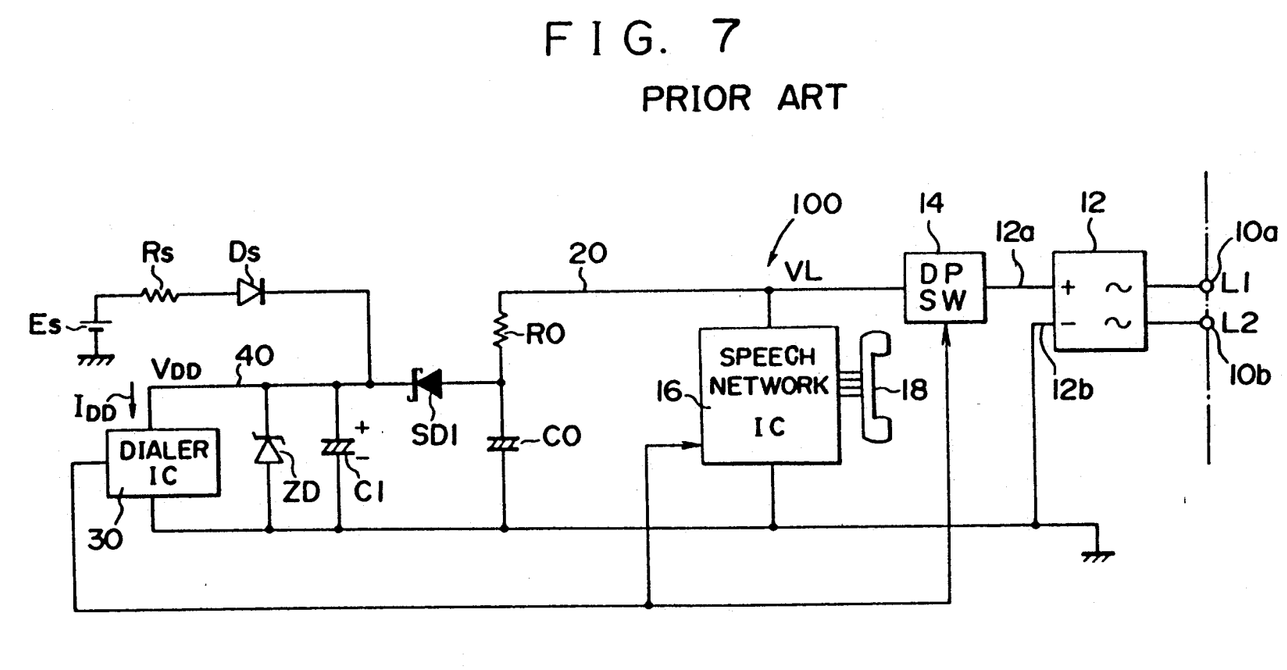
FIG. 7 is a circuit diagram showing a conventional electric power circuit of a telephone.

In FIG. 7, left side of a chain-dot line shows a telephone set 100 connected to a pair of telephone circuit lines L1 and L2 with connectors 10a and 10b. Since the connectors 10a and 10b are also connected to a diode bridge 12, a positive voltage will be delivered constantly from a positive output terminal 12a even though a path of positive voltage is interchanged between the two lines.

A dial pulse switch 14 is connected to the positive output terminal 12a of the diode bridge 12. When dialing a number, the dial pulse switch 14 generates dial pulses transmitted from the telephone circuit lines L1 and L2 by periodically interrupting direct-currents.

A voltage VL output from the dial pulse switch 14 is then fed to a speech network IC 16. The speech network IC 16 is connected to a handset 18 and produces an output of voice signals, which are entered from the handset 18, to the telephone circuit lines L1 and L2, and vice versa.

The voltage VL output from the dial pulse switch 14 is also supplied to a dialer IC 30 as a power. However, the voice signals, which are entered both from the telephone circuit lines L1 and L2 and from the handset 18 through the speech network 16, are superimposed on the voltage VL in the form of alternating current signals. Therefore, it is not preferable to supply the voltage VL to the dialer IC 30 as they are. To solve this problem, there is provided a circuit for supplying a direct current voltage VDD to the dialer IC 30 constantly at a predetermined value.

Specifically, one end of a supply line 20 is connected to the positive output terminal 12a of the diode bridge 12, while the other end thereof is grounded by way of a resistor R0 and a capacitor C0. The capacitor C0 constantly supplies a predetermined value of voltage to a node where the capacitor C0 and the resistor R0 are connected each other being independent of fluctuations of the voltage VL. As a consequence, it becomes possible to maintain the voltage at the node nearly as much as the voltage VL.

However, since the capacitor C0 has an impedance of nearly zero to alternating current components (hereinafter referred to as "a.c. components") on the supply voltage VL, a.c. components flow to the ground. To prevent this, as one of fundamental requirements for the telephone set 100, it is necessary to secure the presence of the impedance of 600 ohms or more at inside of the telephone 100, which is connected to the telephone circuit lines L1 and L2. For securing the impedance of 600 ohms or more and to prevent attenuation of a.c. components on the supply voltage VL, a resistor R0 is provided in the circuit. Although the resistance value required for the resistor R0 is 600 ohms or more, usually used a resistor having the value ranging 1k to 2k ohms.

Meanwhile, the node voltage between the resistor R0 and the capacitor C0 is fed to the dialer IC 30 as its supply voltage VDD by way of a schottky diode SD1 which is disposed for preventing a reverse current from a circuit on the following stage. A capacitor C1 for producing a constant voltage and a zener diode ZD are connected on the way between the line 40, through which the voltage VDD passes, and the ground. More specifically, the capacitor C1 is used for smoothing the voltage VDD, and the zener diode ZD is for maintaining the voltage VDD at a predetermined value or less.

The telephone 100 is further provided with a reserve battery ES for supplying a power to the dialer IC 30 in case no power is supplied from the lines L1 and L2 being disconnected to the telephone set 100. A direct current voltage at a desired level is delivered from the reserve battery ES towards the voltage supply line 40 through a resistor RS and a diode DS. The schottky diode SD1 is therefore disposed to prevent a power of the battery ES from flowing into the power line 20.

The dialer IC 30 is connected to keypads (not shown) and supplies a dialing signal entered from the keypads to both the speech network IC 16 and the dial pulse switch 14 so as to transmit DTMF signals or dial pulse signals to the lines L1 and L2.

In the aforementioned arrangement, the voltage VL taken out from the lines L1 and L2 is supplied to the dialer IC 30 in the form of direct current voltage VDD. Meanwhile, a.c. components superimposed on the supply voltage VL attenuates within a level determined by the resistor R0.

As has been mentioned above, according to the existing telephone set 100, the resistor R0 serves to obtain the direct current voltage VDD with the impedance maintained at a predetermined level or more.

According to the arrangement of the existing telephone set, however, the obtained voltage VDD is reduced as low a little as causing the voltage drop due to the resistor R0 when compared to the supply voltage VL. In result, the voltage VDD fed to the dialer IC 30 becomes too low to drive the IC, severely restricting the design and operation of the dialer IC 30.

Namely, there exists a standard that a voltage between the telephone circuit lines L1 and L2 should not exceed 6V at 20 mA though the voltage is subject to variations that are caused by changing lengths of telephone line. Accordingly, the voltage VL output by way of the dial pulse switch 14 is generally set to about 4V at a line current of 20 mA. In case a supply current to the dialer IC 30 is 1 mA and the resistor R0 is 1 k ohms, the obtained voltage will be about 3V or so.

In order to operate transistors embedded in IC, a voltage supplied thereto should preferably be increased to as high enough as to be operative. In case the supply voltage VDD is as low as about 3V, design flexibility of the circuit is consequently restricted. As another problem, according to the existing circuit, the more the current IDD fed to the dialer IC 30 increases, the more current drop is caused by the resistor R0, resulting in a small available current.

SUMMARY OF THE INVENTION

The present invention is to solve the above mentioned drawbacks and to provide an electric power circuit for use in a telephone set use capable of providing high voltage and large magnitudes of current.

According to a first aspect of the invention, an electric power circuit for telephone set use comprises a current mirror amplifier circuit composed of an input-side transistor whose base and collector are interconnected and an output-side transistor whose base is common with that of the input-side transistor, and a by-pass capacitor for bypassing a.c. components superimposed on a power delivered from a pair of telephone circuit lines, thereby obtaining a constant direct-currents as much as an electric difference existing between the supply voltage and the common base of the current mirror circuit.

With this arrangement of the current mirror amplifier circuit as mentioned above, direct-currents amplified by a desired amplification ratio is obtained from an output terminal of the output-side transistor because of the characteristics of the current mirror that a current produced from the output-side transistor is in proportion to that of the input side transistor.

Moreover, there is provided a transistor at the downstream of the output side transistor for maintaining the electrical potential difference between the collector and emitter of the output-side transistor at a predetermined value or more, so that the impedance is secured sufficiently enough to a.c. components by bypassing superfluous currents flowing into the output-side transistor.

Further, at least a pair of voltage-dividing resistors are connected to the downstream of the input-side transistor for securing the impedance to a.c. components, which are supplied from the by pass capacitor, at a predetermined value constantly.

Furthermore, since the base of the transistor, bypassing superfluous currents, is connected to a node of the voltage-dividing resistors, the transistor is then turned on/off in accordance with fluctuations due to a.c. component, varying the potential at the downstream of the output-side transistor.

In addition, the electric power circuit comprises a diode, the anode of which is connected to the node between the output-side transistor and the by-pass transistor, on the other hand, the cathode of which is connected to the subsequent circuit, for preventing a reverse current from a circuit on the subsequent stage; and a capacitor connected to the cathode of the diode, for securing voltages, which are output from the cathode, at a predetermined value, whereby it becomes possible to produce high voltage and large magnitudes of current with the impedance secured at the value enough to a.c. components superimposed on the supply voltage.

Since the by pass capacitor is connected to the input-side transistor, a.c. components superimposed on the power voltage, which are supplied from the diode bridge, are transferred to the base of the input-side transistor via the by-pass capacitor, varying the base potential thereof in accordance with fluctuations due to a.c. components.

To this end, direct currents having a constant value, which is equivalent to the potential difference between the supply voltage and the base potential of the input side transistor, flow into the input side transistor, whereby it becomes possible to obtain direct-currents in proportion to the magnitude of the current passing through the input-side transistor.

Moreover, since the transistor for bypassing superfluous currents is disposed at the downstream of the output-side transistor and operates in accordance with fluctuations due to a.c. components on the voltage passing through the supply line 20, the potential at the downstream of the output-side transistor varies in response to the fluctuations due to a.c. components.

Thus, it is possible to maintain the collector emitter voltage of the output-side transistor at a predetermined value or more. Consequently, the VCE of the output-side transistor saturates in negative half cycles of a.c. components, preventing impedance drop.

When the by-pass transistor turns on, currents output therefrom are not subject to unwanted reverse-bias voltages, which are discharged from the capacitor C1, by means of the diode.

The above and other advantages, features and additional objects of this invention will be manifest to those versed in the art upon making reference to the following detailed description and the accompanying drawings in which a structural embodiment incorporating the principles of this invention is shown by way of illustrative example.

PREFERRED EMBODIMENTS OF THE INVENTION

Preferred embodiments of an electric power circuit for use in a telephone set according to the present invention is now explained with reference to the accompanying drawings.

Figure 1:
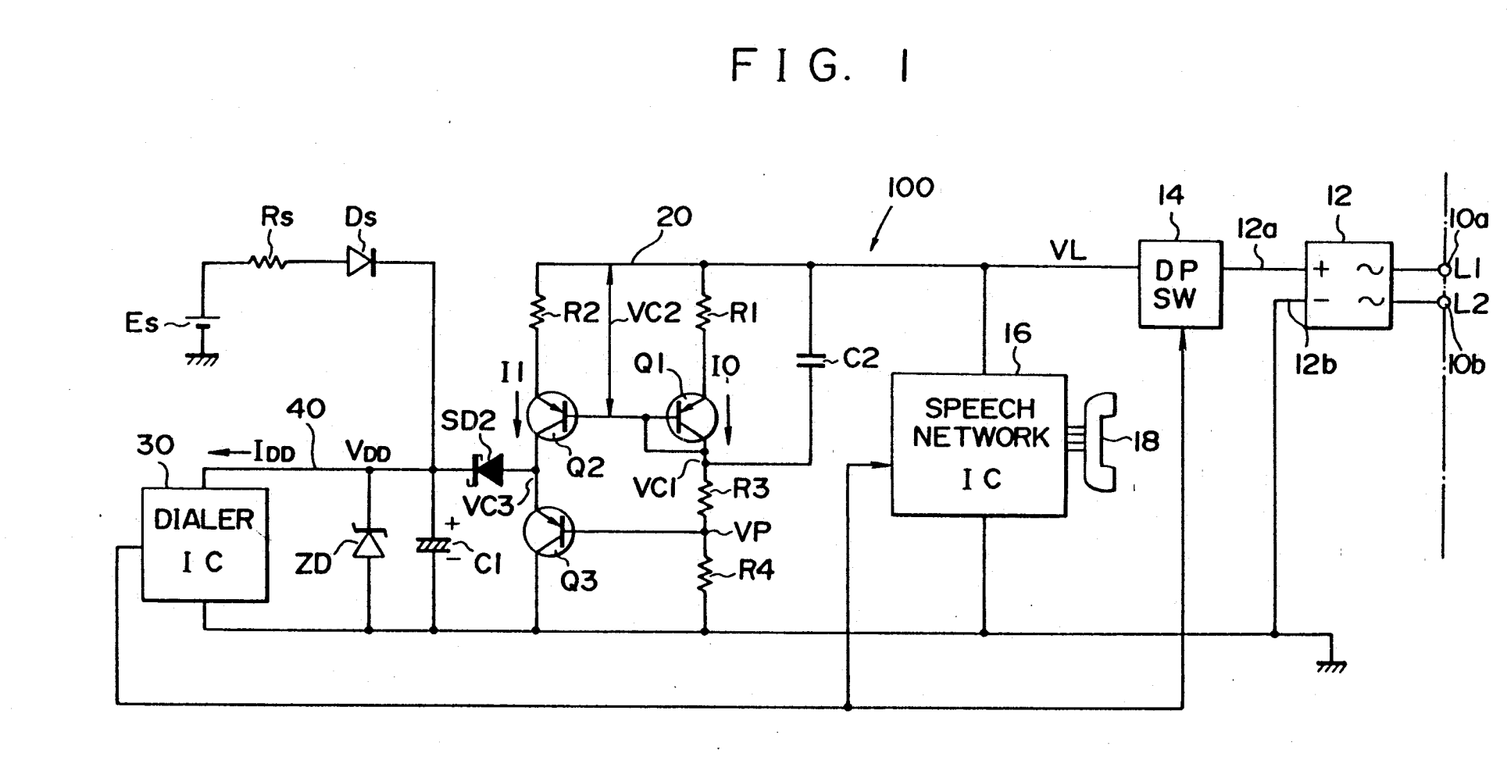
FIG. 1 is a circuit diagram of an electric power circuit for use in a telephone set embodying this invention.

FIG. 1 is a schematic diagram showing a structure of the preferred embodiment of the present invention. The same reference numerals designate the similar parts throughout the drawings.

In this preferred embodiment, the supply power VL, delivered from the diode bridge through a supply line 20, flow into two paths; one passes along a resistor R1, an input-side transistor Q1 whose base and collector are interconnected, and resistors R3 and R4 towards the ground; and the other passes along a resistor R2, an output-side transistor Q2, and a by-pass transistor Q3 for bypassing a superfluous current towards the ground.

In this arrangement, a capacitor C2 for bypassing a.c. components is connected across the transistor Q1 and the resistor R3; the base of the output-side transistor Q2 is connected to the node between the transistor Q1 and the resistor R3; and the base of the transistor Q3 for bypassing superfluous currents is connected to the node between the resistors R3 and R4.

The transistors Q2 and Q3 are p-n-p type transistor through which a current flows from the line 20 towards the earth, and the transistor Q1 is also p n p type transistor whose base and collector are interconnected.

An operation of this embodiment is explained hereinbelow.

As has been described above, the cathode of the transistor Q1 is connected to the base of the transistor Q2. Since the transistor Q1 is a p-n-p type transistor whose base and collector are interconnected, thus constituting a current mirror. As is well known, according to the characteristics of the current mirror circuit, the magnitude of a current I1 passing though the transistor Q2 is in proportion to the magnitude of a current I0 passing through the transistor Q1. Namely, the gain at the amplifier Q2 is defined as the ratio of the transistor Q2 to the transistor Q1 for the size of their emitters. For example, when a current of 1 mA flows as the current I1, assuming that the ratio of the emitter size is one tenth, a current of 100 uA flows as the current I0.

Figure 2:
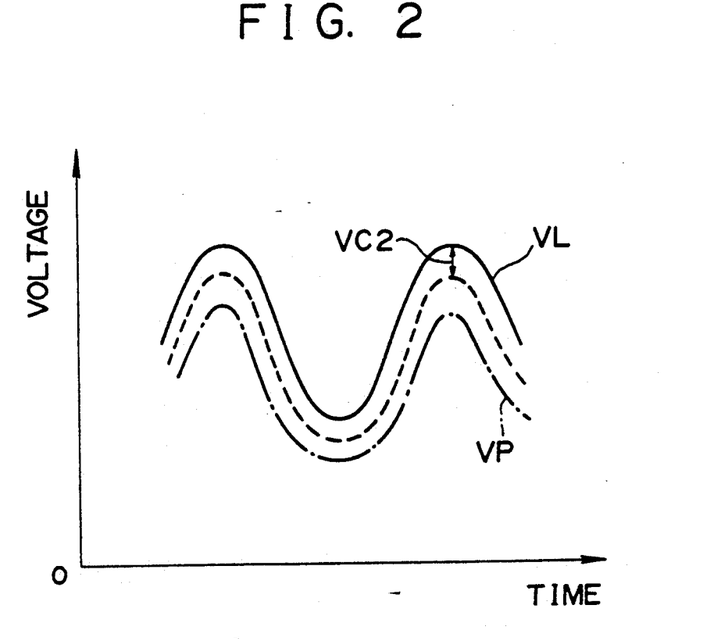
FIG. 2 is a characteristic graph showing a voltage characteristic at each of the points of the electric power circuit.

As illustrated by a solid line in FIG. 2, when the supply voltage VL varies with a predetermined cycle because of voice signals superimposed thereon, a.c. components pass through the capacitor C2 and flow to the ground via the resistors R3 and R4. Accordingly, a potential VC 1, at the negative-side of the capacitor C2, varies in accordance with fluctuations of the supply voltage VL as illustrated by a broken line in FIG. 2. As a result, electric potentials at VC 2 across the resistor R1 and the transistor Q1, remain stable at a predetermined level.

Meanwhile, the direct current I0 becomes equivalent to the current passing through the resistors R3 and R4 unless a.c. components are superimposed on the supply voltage VL, and the current is then given by $$I0 = (VL - VC2) / (R3 \text{ and } R4).$$

Also, the current I1 passing through the transistor Q2 is expressed by $$I1 = nI0$$

where, the letter "n" represents the current ratio determined by the characteristics of the transistors Q1 and Q2.

At this time, a.c. components superimposed on the supply voltage VL flow to the ground via the resistors R3 and R4.

Accordingly, the impedance to a.c. components on the supply voltage VL is equivalent to the sum of the resistance values of the resistors R3 and R4, whereby it becomes possible to secure the impedance of 600 ohms or more to a.c. components if the impedance is set to as much as 600 ohms or more. Although the value of the current I0 is determined by the combined resistance values of the resistors R3 and R4, it is possible to obtain the current I1 of any desired value amplified in proportion to the current I0. In case the resistors R3 and R4 take such a large value as tens of kilo ohms to ensure extremely large amounts of impedance to a.c. components on the supply voltage VL, large magnitude of output currents can be obtained as the current I1.

Figure 3:
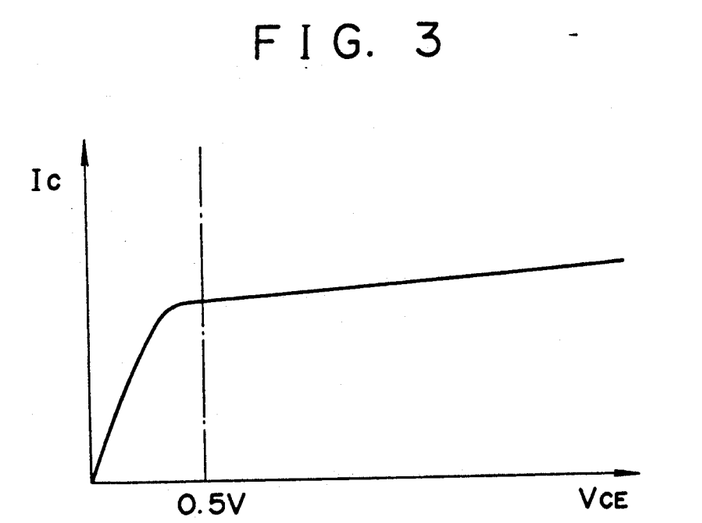
FIG. 3 is a characteristic graph showing a relationship between VCE and IC of a transistor.

In general, as properties of a transistor, when the voltage VCE, between the collector and emitter of the transistor, drops to a very small value, saturation occurs, so that the collector current IC varies in accordance with fluctuations due to the voltage VCE. That is, the collector current IC varies with small amounts in response to deviations of the VCE when the collector-emitter voltage VCE is 0.5V or more, whereas the collector current IC varies in response to the VCE when the VCE is in the region of less than 0.2-0.3V where the transistor causes saturations.

Therefore, when the VCE of the output-side transistor Q2 falls to a small value, the transistor Q2 allows currents not to flow in accordance with the base potential but to flow with the potential between the collector and emitter thereof. According to the power supply circuit embodying the present invention, the collector of the transistor Q2 is grounded by way of the schottky diode SD2 and the capacitor C1.

With this arrangement, in the state that the collector-emitter voltage of the transistor Q2 drops to a very small value, the impedance to a.c. components also falls, whereby the potential at the output-side VC 3 varies responding to fluctuations due to a.c. components.

As a significant feature of this embodiment, a by-pass transistor Q3 is provided for preventing saturations of the transistor Q2. That is, the operation of the transistor Q3 enables the collector-emitter voltage of the transistor Q2 to remain stable at a predetermined potential.

Specifically, the base-emitter voltage VBE 1 of the transistor Q2 and the base-emitter voltage VBE 2 of the transistor Q3 are generally determined by properties of these transistors, it is consequently possible to employ the transistor having the same property for the respective transistors Q2 and Q3. In addition, the resistor R3 is connected between the bases of the transistors Q2 and Q3; therefore, if a voltage drop at the resistor R3 is denoted as VR3, the base current of the transistor Q2 is given by $$VBE2 + VR3 = VCE2 + VBE3$$

$$VR3 = VCE2.$$

Thus, the collector-emitter voltage VCE 2 of the transistor Q2 becomes equivalent to the voltage drop at the resistor R3. Accordingly, if a resistor having a suitable resistance value is used for the resistor R3, the voltage drop available at the resistor R3 can be set to 0.5V or more.

More in detail, since the base voltage VP of the transistor Q3 varies in accordance with fluctuations due to a.c. components on the supply voltage VL as shown in FIG. 2, superfluous currents flowing to the transistor Q2 can be bypassed to the earth so as to prevent the impedance to a.c. components from dropping by that the collector potential of the transistor Q2 falls below the voltage level secured by the capacitor C1 in negative half cycles, thereby turning the transistor Q3 on before saturations occur in the transistor Q2.

As is evident from the above description, if the resistance value of the resistor R3 is set to a suitable value, the collector-emitter voltage VCE1 of the transistor Q2 is consequently ensured at 0.5V or more, so that a.c.

components on the supply voltage VL do not flow out to the ground.

In the mean time, when the transistor Q3 operates in the manner as described above, currents flow from a line 40, through which a supply voltage VDD passes, towards the ground via the transistor Q3. However, the schottky diode SD 2 is disposed on the way of this path to the ground, so that the voltage VDD does not flow to the earth. Particularly, according to the electric power circuit of the embodiment, the schottky diode SD2 functions not only to prevent a current from a direct-current battery ES but prevent the reverse-bias voltage from the VDD when the transistor Q3 is turned on.

As mentioned above, according to the circuit of the embodiment, it is possible to secure the presence of impedance as highly as sufficient to a.c. components on the voltage VL by setting the value of the resistors R3 and R4 to a large value, thereby reducing interferences, which are picked up from the electric power circuit, to voice signals on the supply voltage VL. Further, voltage drop being caused while passing through the supply line of the voltage VDD can remarkably be reduced and large amounts of voltage is ensured by the transistor Q2 disposed on the way of the supply line. Even though the values of the resistors R3 and R4 for securing the impedance are set to a large value, large magnitudes of currents is ensured to be supplied to the dialer IC 30 by adjusting the magnitude of the current passing through the output-side transistor Q2 to large amounts.

Here, since the resistors R1 and R2 each of which has a small resistance value are disposed in order to correct errors in forward-bias voltages applied to the transistors Q1 and Q2, a voltage drop caused by these resistors can be reduced to as least as possible.

Results of the experiment by employing the electric power circuit of this embodiment will be explained hereafter.

Figure 4:
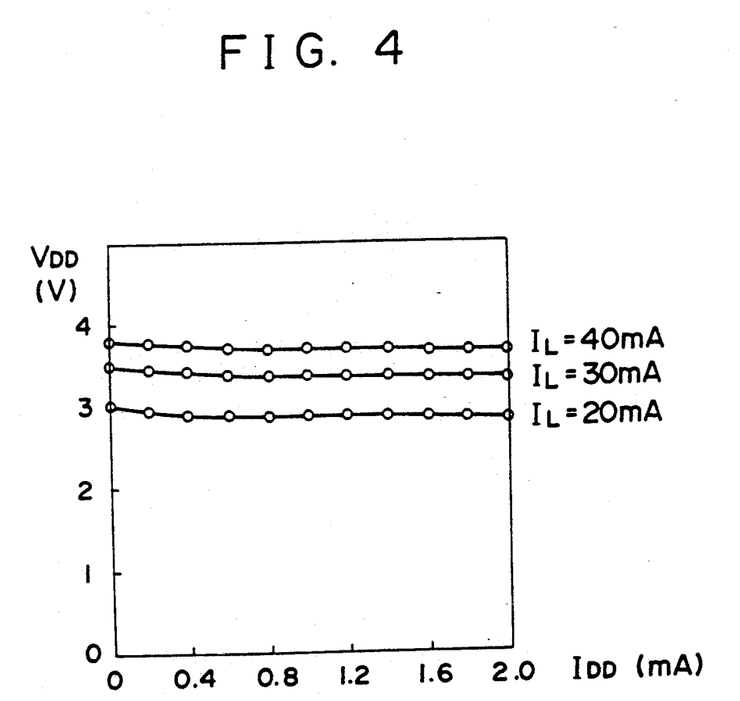
FIG. 4 is a characteristic graph showing a relationship between IDD and VDD of the electric power circuit.

FIG. 4 is a characteristic graph illustrating a relationship between a current IDD flowing into the dialer IC 30 and a voltage VDD supplied thereto, the graph in which the voltage VDD is secured at a constant value, being independent of the current IDD. Although, according to the conventional electric power circuit, the voltage VDD drops at the resistor R0 the moment the current IDD increases, it can be understood that these drawbacks inherent in the conventional circuit can be solved by the electric power circuit according to the present invention. A current IL denotes a current to be delivered to the telephone set 100 through the diode bridge 12. This current is usually ensured at 20 mA or more depending on the type of telephone sets.

Figure 5:
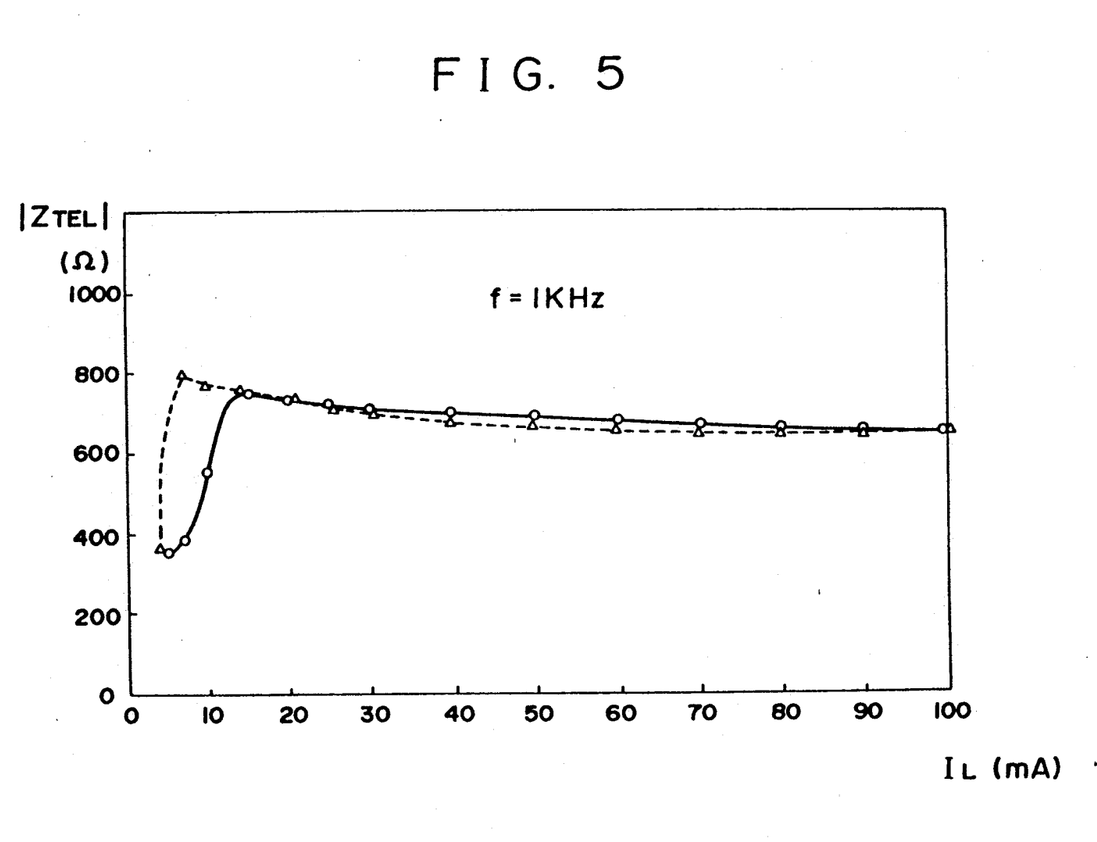
FIG. 5 is a characteristic graph showing a relationship between IL and ZTEL of the electric power circuit.

FIG. 5 is a characteristic graph showing a relationship appears between a.c. components and an impedance ZTEL when the current IL changes. From this graph, it can be understood that the impedance remains stable at 600 ohms or more if the current IL is more than 20 mA and a.c. components are 1 kHz, 0 dBv.

Figure 6:
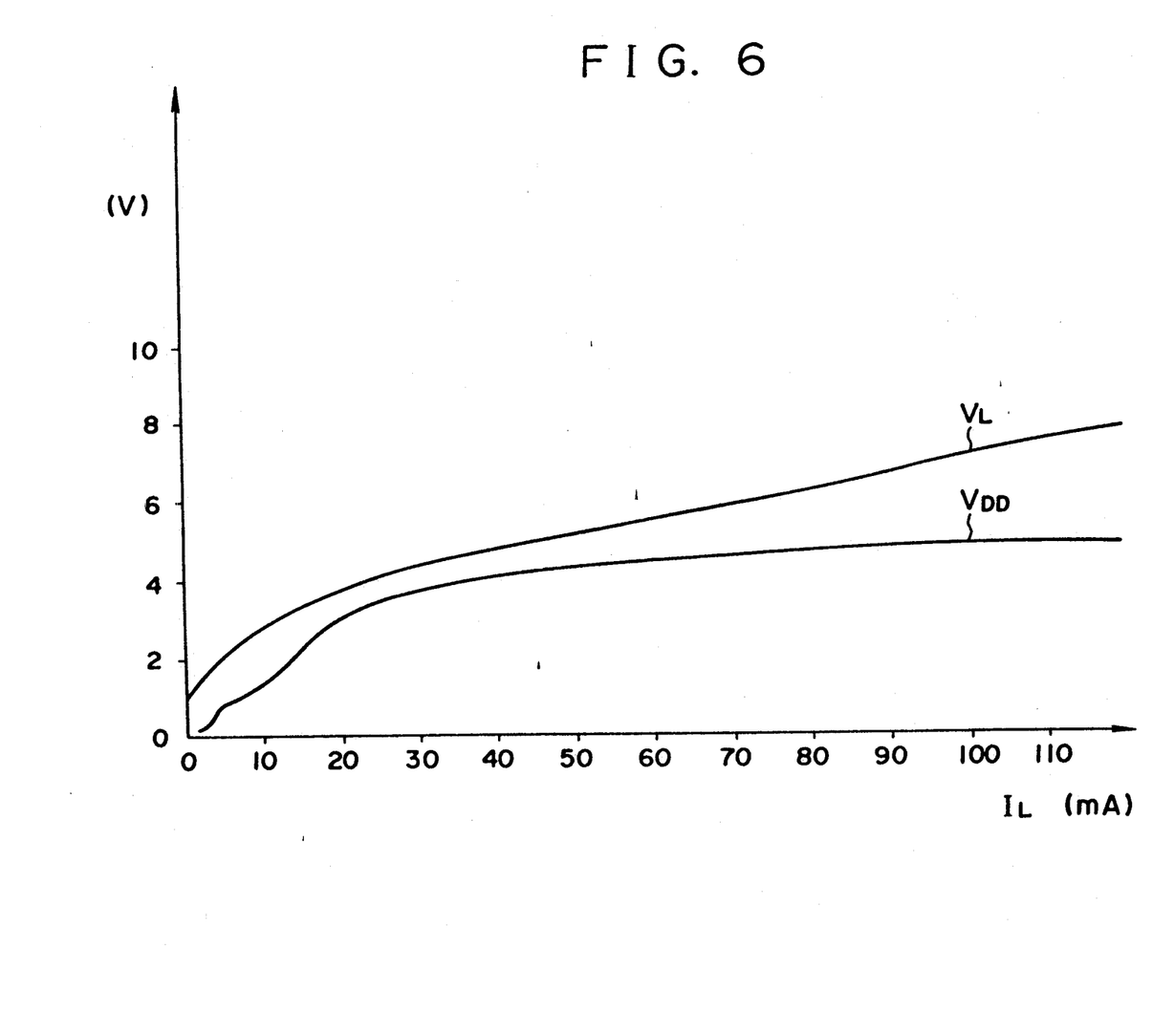
FIG. 6 is a characteristic graph showing a relationship between IL and VDD, VL of the electric power circuit.

FIG. 6 is a characteristic graph showing a relationship among the current IL, the voltage VL, and the voltage VDD. From FIG. 6, it can also be understood that the voltage VDD can be ensured highly enough if the current IL is maintained at 20 mA or more.

As has been explained above, according to the electric power circuit of the present invention, high voltage and large magnitudes of currents can be drawn from the supply voltage with the internal impedance of the telephone set remained sufficiently high, thereby achieving flexible design and operation of IC.

What is claimed is:

1. An electric power circuit for telephone set use, said electric power circuit comprising:
   (a) a current mirror circuit being composed of an input-side transistor, the base and collector of which are connected together, for producing a predetermined value of direct-currents from a supply voltage taken out from a telephone line and an output-side transistor, for producing output currents amplified in response to the direct-current passing through said input-side transistor;
   (b) a by-pass capacitor, connected between the upstream-side and the common-base of said current mirror, for taking out alternating current components superimposed on said supply voltage to be delivered to a circuit on a following stage and for securing the magnitude of direct currents passing through said input-side transistor by ensuring potential difference between the base of said input-side transistor and said supply voltage at a predetermined value;
   (c) a by-pass transistor, connected to the downstream-side of said input-side transistor, for bypassing superfluous currents flowing into said output-side transistor by varying a potential at the downstream of said output-side transistor in response to fluctuations due to said alternative current components on said supply voltage;
   (d) at least a pair of potential dividing resistors, which are disposed at the downstream-side of said input-side transistor and to the junction of which the base of said by-pass transistor is connected, for varying the base potential of said by-pass transistor in accordance with fluctuations due to said alternating current components delivered by way of said by-pass capacitor;
   (e) a diode, the anode of which is connected to the node between the collector of said output-side transistor and the emitter of said by pass transistor, for preventing a reverse current from a circuit on a subsequent stage;
   (f) a capacitor, connected to the cathode of said diode, for securing a voltage at the cathode-side of said diode at a predetermined value.

2. An electric power circuit according to claim 1, wherein said two transistors of said current mirror are p-n-p type transistor.

3. An electric power circuit according to claim 2, wherein said electric potential between the collector and the emitter of said output-side transistor is at least of 0.5V or more.

4. An electric power circuit according to claim 1, wherein a terminating impedance of the telephone set is at least 600 ohms.

5. An electric power circuit according to claim 1, wherein said diode is a schottky diode.

6. An electric power circuit according to claim 1, wherein currents of said supply voltage drawn from said telephone circuit line are at least of 20 mA or more.

7. An electric power circuit according to claim 1 wherein the electric power circuit has an impedance of at least 10 Kilohms.

* * * * *